United States Patent
Isobe et al.

(10) Patent No.: US 7,394,091 B2
(45) Date of Patent: Jul. 1, 2008

(54) COMPOSITE NANO-PARTICLE AND METHOD FOR PREPARING THE SAME

(75) Inventors: Tetsuhiko Isobe, Kanagawa (JP); Yasushi Hattori, Kanagawa (JP); Shigeo Itoh, Chiba (JP); Hisamitsu Takahashi, Chiba (JP)

(73) Assignee: Keio University Faculty of Science and Technology (JP)

( * ) Notice: Subject to any disclaimer, the term of this patent is extended or adjusted under 35 U.S.C. 154(b) by 123 days.

(21) Appl. No.: 10/521,233

(22) PCT Filed: Jul. 16, 2003

(86) PCT No.: PCT/JP03/09032

§ 371 (c)(1),
(2), (4) Date: Jul. 28, 2005

(87) PCT Pub. No.: WO2004/007636

PCT Pub. Date: Jan. 22, 2004

(65) Prior Publication Data

US 2006/0234417 A1    Oct. 19, 2006

(30) Foreign Application Priority Data

Jul. 16, 2002 (JP) ............................. 2002-207287

(51) Int. Cl.
 *H01L 29/06* (2006.01)
 *H01L 29/12* (2006.01)
 *C09K 11/72* (2006.01)

(52) U.S. Cl. .................... 257/10; 977/824; 313/467; 558/312; 252/301.6 R

(58) Field of Classification Search ............ 257/10; 313/467, 486, 503, 504; 252/301.16, 301.6 R; 568/8; 558/312; 977/773, 777, 810, 824
See application file for complete search history.

(56) References Cited

U.S. PATENT DOCUMENTS 5,446,286 A * 8/1995 Bhargava ............ 250/361 R
5,990,479 A    11/1999 Weiss et al.
6,117,363 A    9/2000 Ihara et al.

(Continued)

FOREIGN PATENT DOCUMENTS

| JP | 58-80375 | 5/1983 |
|---|---|---|
| JP | 11-502610 | 3/1999 |
| JP | 2000-265166 | 9/2000 |
| JP | 2001-262138 | 9/2001 |
| JP | 2002-104842 | 4/2002 |
| WO | WO 00/17655 | 3/2000 |

OTHER PUBLICATIONS

International Search Report corresponding to PCT/JP03/09032, under dae of mailing of Sep. 30, 2003.

*Primary Examiner*—W. David Coleman
(74) *Attorney, Agent, or Firm*—Quarles & Brady LLP

(57) ABSTRACT

There is provided composite nano-particles comprising nano-crystal particles dispersed stably and individually in suspension in high concentration without mutual aggregation of the nano-particles. A determined amount of pure water or deionized water is poured into a reactor, into which is introduced nitrogen gas at rate of 300 cm$_3$/min for a given time while agitating with a stirrer to remove dissolved oxygen in the pure water, allowing to stand in an atmosphere of nitrogen. Next, the inside of the reactor is maintained in an atmosphere of nitrogen and sodium citrate as a dispersion-stabilizing agent, an aqueous solution of MPS as a surface-modifying agent, an anion aqueous solution for co-precipitation as a nano-crystal and a cation aqueous solution are added, in that order. Then, an aqueous solution of sodium silicate is added to the reactor, which is then allowed to stand in the dark place in an atmosphere of nitrogen after agitation. At that time, a vitrification-inhibiting agent may be added in order to inhibit the growth of glass layer.

9 Claims, 8 Drawing Sheets

U.S. PATENT DOCUMENTS

| | | | | |
|---|---|---|---|---|
| 6,207,392 | B1 * | 3/2001 | Weiss et al. | 435/7.1 |
| 6,319,426 | B1 * | 11/2001 | Bawendi et al. | 252/301.4 R |
| 7,067,072 | B2 * | 6/2006 | Chen | 252/301.6 S |
| 7,288,239 | B2 * | 10/2007 | Ibarra et al. | 423/554 |
| 7,335,418 | B2 * | 2/2008 | Sato et al. | 428/403 |

* cited by examiner

COMPOSITE NANO-PARTICLE AND METHOD FOR PREPARING THE SAME

CROSS-REFERENCE TO RELATED APPLICATIONS

This application claims priority to International Patent Application PCT1JP2003/009032, filed 16 Jul. 2003, which claims priority of JP application 2002-207287 filed 16 Jul. 2002.

BACKGROUND OF THE INVENTION

1. Field of the Invention

The present invention generally relates to a composite nano-particle in which each of more than two kinds of chemical species has a phase individually and forms a nano-sized particle and method for preparing the same and, more particularly relates to a nano-sized nano-particle for, for example a composite low energy electron exciting light emitting phosphor etc., composed of independent good dispersible particles, which is formed without coagulation of composite nano-particles in the process of production.

2. Discussion of Background

In recent years, it has been noted that a nano-crystal (nano-structure crystal) has unique optical characteristics in an ultrafine particle such as Si, Ge, etc. porous silicon, semiconductor of II-IV group element in the periodic table. The nano-structure crystal herein used means a crystal particle having a particle diameter of several nm (nano-meters) and often referred to as nano-crystal.

By the way, different types of phosphors are used in a display such as a television etc. A phosphor currently used for a display of a television etc. is synthesized by firing raw materials at high temperatures. The particle diameter of the phosphor thus synthesized is several micrometers (3-10 μm). On the other hand, in recent years, a low-profile display has been desired in the filed of television etc. and a lightweight flat display such as a plasma display (hereinafter referred to as PDP), field-emission-display (hereinafter referred to as FDD), electro-luminescence-display (hereinafter referred to as ELD) has received considerable attention.

When the above-described FED which has received particular attention is formed in low-profile, it is necessary to lower the voltage of electron beam. However, when such a phosphor having a particle diameter of several micrometers as above described is used in a low-profile display, sufficient emission can not be obtained because low voltage of electron beam. That is to say, such a low-profile display can not excite sufficiently a conventional phosphor.

A low energy electron exciting light emitting phosphor is generally used in a vacuum fluorescent display. Particularly, a nano-sized phosphor is suitable for an FED, a highly-refined thin-profile vacuum fluorescent display, etc.

On the other hand, a nano-crystal phosphor can excite the afore-mentioned phosphor with an electron beam irradiated by low voltage and to emit light. A phosphor which satisfies such requirements is exemplified by a II-IV group semiconductor having such a nano-structure crystal as above described.

Unexamined Patent Publication (Kokai) No. 10-310770 discloses a method of preparing a nano-sized phosphor by using co-precipitation. In such a conventional invention as disclosed in the publication, a nano-sized phosphor particle doped with an activating agent by a liquid phase reaction using co-precipitation is formed and simultaneously, an organic acid acrylic acid, methacrylic acid, etc. is added to the liquid phase reaction. Thereby, the surface of the afore-mentioned phosphor particle is coated with the organic acid and defects on the surface of the phosphor particle are decreased to make improvements in the emission efficiency possible.

Further, an activating agent is dispersed uniformly on a II-IV group semiconductor by the afore-mentioned liquid phase reaction using the co-precipitation method. According to such a prior art, the only organic acid is boned to ZnS:Mn via S—O bond added. Unexamined Patent Publication (Kokai) No. 10-310770 describes on pages 6 and 8 that when ZnS:Mn is bonded with an organic acid, it coats the surface of the phosphor particle and supplies energy required for light emission. Since, however, coating with only organic acid is performed is such a technique as described in Unexamined Patent Publication (Kokai) No. 10-310770, there is a problem in the stabilization.

Unexamined Patent Publication (Kokai) No. 2000-265166 discloses a phosphor which is formed by coating a nano-sized nano-crystal phosphor particle ZnS-Tb obtained by the liquid phase reaction using precipitation with a glass component. Such a glass component as described in the publication is a gel-like (—SiO—) n film obtained by polymerizing tetrakissilane in ethanol, ion-exchanged water and hydrochloric acid.

In such an invention as described in Unexamined Patent Publication (Kokai) No. 2000-265166, a nano-crystal phosphor or another composite nano-particle obtained by the liquid phase reaction using precipitation is reacted with a gel-like glass component, that is, coated directly with a gel-like (—SiO—) n film obtained by polymerizing tetrakissilane in ethanol, ion-exchanged water and hydrochloric acid, thereby improving the light emission efficiency in electron beam excitation emission.

However, a composite nano-particle the surface of which is coated with a glass component constituted by such a prior art aggregates, similarly to a conventional composite nano-particle. Therefore, original characteristics of nano-crystal can be hardly obtained.

Among the afore-mentioned nano-crystal, a semiconductor nano-crystal having a quantum size effect is situated in a transition region between a bulk semiconductor of monocrystal or large particles and a molecule and shows characteristics different from them. Therefore, it has received considerable attention in a variety of fields.

In the case of a nano-crystal having specific characteristics for a crystal particle of a metal or insulator having a particle diameter of several nano-meters other than the above-described semiconductor nano-crystal, nano-crystal phosphor, a nano-crystal having excellent dispersibility is provided.

Tremendous research effort has been made on the optical characteristics of the afore-mentioned semiconductor nano-crystal toward the practical use for an optical material, phosphor material, photo-catalyst, etc. However, such a semiconductor nano-crystal has problems to be solved, that is to say, it is unstable compared with a bulk semiconductor and easy to be decomposed and degraded, control of particle diameter is hard because of the presence of particle distribution, synthetic method is hard or complicated, mass-production is hard, etc.

By the way, among the afore-mentioned semiconductor nano-crystals, a method of preparing a conventional nano-sized phosphor has such defects as described below. While a nano-sized phosphor particle can be easily synthesized by a general co-precipitation method of a prior art, nano-sized phosphor particles aggregate each other immediately in a reaction solution and the particle size of the nano-sized phosphor particle thus obtained is made apparently larger than Bohr diameter of ZnS. Therefore, there are problems that a group of thus aggregated phosphor particles is coated with an organic acid or glass component, and particle size is made larger furthermore, and the quantum size effect or quantum confined effect can not be sufficiently exerted.

Next, the afore-mentioned quantum size effect and quantum confined effect are explained in detail. Change in physical properties depending on size appears particularly in optical properties. Specifically, when the particle size of the nano-sized phosphor particle is made smaller than the effective Bohr diameter of ZnS, it is well known that its electron state is different from that of bulk semiconductor. That is to say, when a phosphor is a very small atomic group in the order of nano-meter, a band rank which must be continuous originally is discontinuous with an increase in number of atom, and consequently the energy of HOMO lowers, and the energy of LUMO rises. Therefore, a band gap increases and excitation energy also increases. These phenomena are called "quantum size effect."

When a phosphor absorbs an electron beam or light, it forms an electron and a hole in a band. While an electron and a hole move individually in a state of bulk, a pair of electron-hole (exciton) is formed stably because the electron and hole are confined in a very narrow space in a nano-particle. Thereby, the energy transportation efficiency to light emission, that is, the light emission quantum efficiency increases. These phenomena are called "quantum confined effect."

A combination of chemical species constituting a nano-crystal must be selected, depending on a specific objective. Such a combination is exemplified by [metal/oxide/sulfide] or [conductor/semiconductor/insulator]. For example, CdS/SiO$_2$, CdS/CdSe, Au/SiO$_2$, etc. are exemplified.

PROBLEMS TO BE SOLVED BY INVENTION

Therefore, a problem to be solved by the inventors of the present invention is to provide a nano-crystal phosphor as an example of a composite nano-particle, which is deemed to give a practical luminance in the penetration depth of electron beam of several nano-meters by an accelerated voltage of an order of 100eV. In order to take advantage of the characteristics of the nano-crystal, the problem to be solved by the inventors of the present invention is to provide a nano-crystal particle having high productivity in which the particles constituting the phosphor particles are dispersed stably and individually.

Further, the inventors of the present invention have found that when a nano-crystal phosphor is produced, in order to take advantage of the above-described characteristics, it is necessary to prevent the growth of particle than necessary and not to make the nano-crystal larger than effective Bohr diameter of ZnS phosphor. Then, objects of the present invention are to provide a nano-crystal particle having high productivity in which the particle constituting the phosphor particles are dispersed in suspension in high concentration stably and individually, which is formed by carrying out the synthesis of the phosphor by a co-precipitation method in the presence of a dispersion-stabilizing agent and a surface-modifying agent and coating the surface of particles thus synthesized with negative ion to prevent the aggregation of particles by making use of static repulsion of particles and a method of preparing the same.

DISCLOSURE OF THE INVENTION

A composite nano-particle according to the invention of claim 1 of the present invention comprises a core part of a nano-crystal, a surface-modifying part having a bonding part for bonding the periphery of the core part to the nano-crystal, and a substance having an insulating shell part having as a substrate a substance forming a glass state and is characterized in that the surface of the periphery of the core part is coated with the surface modifying part having the bonding part for bonding to a bond defect of the nano-crystal and the substance having the insulating shell part having as the substrate the substance forming a glass state.

A composite nano-particle according to the invention of claim 2 of the present invention is composed of three parts comprising a core part of a nano-crystal, a surface-modifying part for coating the surface of the core part to modify it, and an insulating shell part the peripheral surface of which is charged by the same charge composed of a substance forming a glass state as to coat the surface of the surface-modifying part.

A composite nano-particle according to the invention of claim 3 of the present invention is composed of nano-sized composite nano-particles comprising a core part of a nano-crystal, a surface-modifying part for coating the surface of the core part to modify it, and an insulating shell part so formed as to coat the surface of the surface-modifying part and is characterized in that the core part and the surface-modifying part are formed simultaneously by a co-precipitation method in the presence of both a dispersion stabilizing agent and surface-modifying agent.

A composite nano-particle according to the invention of claim 4 of the present invention is characterized in that the surface-modifying agent having the surface-modifying part having a covalent bond part forming a covalent bond with the bond defect of the composite nano-particle is an organometallic compound having SH group or —NH$_3$ group at an end group and that the insulating shell part comprises a transparent material.

A composite nano-particle according to the invention of claim 5 of the present invention is characterized in that, in the composite nano-particle, the transparent material comprising the substance forming the glass state constituting the insulating shell part comprises as a main component a compound selected from the group consisting of SiO, SiO$_2$, SiN, SiON, Si$_3$N$_4$, Al$_2$O$_3$, and TiO$_2$.

A composite nano-particle according to the invention of claim 6 of the present invention is a composite nano-particle described in claim 5, in which the dispersion-stabilizing agent is sodium citrate and the surface-modifying agent is illustrated by the general formula;

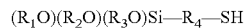

(R$_1$O)(R$_2$O)(R$_3$O)Si—R$_4$—SH

Wherein each of R$_1$, R$_2$, R$_3$ and R$_4$ is an alkyl group.

A composite nano-particle according to the invention of claim 7 of the present invention is a composite nano-particle described in claim 5, in which the nano-crystal particle is a phosphor particle selected from the group consisting of ZnS: Mn, ZnS:Cl, ZnS:Cu, Al, ZnCdS:Ag, Cl, CaS:Eu, CaS:Ce, CaS:Mn, CaS:Cu, CaS:Sb, CaS:Eu, Ce, CaS:Sm, CaS:Pb, CaS:Gd, CaS:Tb, CaS:Dy, CaS:Ho, CaS:Er, CaS;Tm, CaS; Yb, MgS:Eu, MgS:Ce, MgS:Mn, SrS:Eu, SrS:Ce, SrS;Mn, BaS:Eu, BaS:Ce and BaS:Mn.

A composite nano-particle according to the invention of claim 8 of the present invention is characterized in that the surface-modifying layer of the composite nano-particle is carbonized.

A method of preparing a composite nano-particle according to the invention of claim 9 of the present invention comprises the steps of (a) forming, at the same time, a core part of a nano-sized phosphor particle and a surface-modifying part for coating the surface of the core to modify the surface of the core by a co-precipitation method in the presence of a dispersion stabilizing agent and a surface-modifying agent, and (b) forming a nano-sized insulating part on the surface of the surface-modifying part.

A method of preparing a composite nano-particle according to the invention of claim 10 of the present invention comprises the steps of (a) forming, at the same time, a core part of a composite nano-particle and a surface-modifying part for coating the surface of the core to modify the surface of the core by a co-precipitation method in the presence of a vitrification-inhibitor for an insulating part comprising as a substrate a substance for forming a glass state and a dispersion stabilizing agent and a surface-modifying agent, and (b) forming a nano-sized insulating part on the surface of the surface-modifying part.

A method of preparing a composite nano-particle according to the invention of claim 11 of the present invention is a method of preparing a composite nano-particle described in claim 9 or 10, characterized in that the step of forming the composite nano-particle comprises a step of adding as a material for co-precipitating the composite nano-particle an anion material and a cation material, in that order.

A method of preparing a composite nano-particle according to the invention of claim 12 of the present invention is a method of preparing a composite nano-particle described in claim 9 or 10, characterized in that the dispersion-stabilizing agent is a metallic salt having two carboxyl groups or above.

The metallic salt having two carboxyl groups or above is preferably an alkaline metal salt of dicarboxylic acid such as oxalic acid, malonic acid, fumaric acid, etc.

The metallic salt having tow carboxyl groups or above is preferably sodium citrate having three carboxyl groups.

A method of preparing a composite nano-particle according to the invention of claim 13 of the present invention is a method of preparing a composite nano-particle described in claim 9 or 10, characterized in that the surface-modifying agent is an organometallic compound having —$NH_3$ group, —COOH group or $SO_3$ at its end.

The organometallic compound is preferably a silicon compound, an organoaluminum compound or an organotitanium compound.

A method of preparing a composite nano-particle according to the invention of claim 14 of the present invention is a method of preparing a composite nano-particle described in claim 9 or 10, characterized in that the organometallic compound is 3-mercapto propyl trimethoxy silane (MPS) illustrated by the afore-mentioned formula 1.

A method of preparing a composite nano-particle according to the invention of claim 15 of the present invention is a method of preparing a composite nano-particle described in claim 9, characterized in that the insulating shell layer comprises a transparent material.

In the method of preparing the composite nano-particle, the transparent material comprises as a main component a compound selected from the group consisting of SiO, $SiO_2$, SiN, SiON, $Si_3N_4$, $Al_2O_3$ and $TiO_2$.

A method of preparing a composite nano-particle according to the invention of claim 16 of the present invention is a method of preparing a composite nano-particle described in claim 9 or 10, characterized in that in the step of forming the nano-sized insulating shell layer on the surface of the core layer of the nano-crystal, the insulating shell layer comprises sodium citrate.

A method of preparing a composite nano-particle according to the invention of claim 17 of the present invention is a method of preparing a nano-crystal phosphor described in claim 9 or 10, characterized in that the composite nano-particle formed by the co-precipitation method is a phosphor particle selected from the group consisting of ZnS:Mn, ZnS: Cl, ZnS:Cu, Al, ZnCdS:Ag, Cl, CaS:Eu, CaS:Ce, CaS:Mn, CaS:Cu, CaS:Sb, CaS:Eu, Ce, CaS:Sm, CaS:Pb, CaS:Gd, CaS:Tb, CaS:Dy, CaS:Ho, CaS:Er, CaS;Tm, CaS;Yb, MgS: Eu, MgS:Ce, MgS:Mn, SrS:Eu, SrS:Ce, SrS;Mn, BaS:Eu, BaS:Ce and BaS:Mn.

BRIEF DESCRIPTION OF THE DRAWINGS

A more complete understanding of the present invention may be had with reference to the following detailed explanations which are given in connection with the accompanying drawings, in which.

DESCRIPTION OF THE PREFERRED EMBODIMENTS FOR CARRYING OUT THE INVENTION

Figure 1:
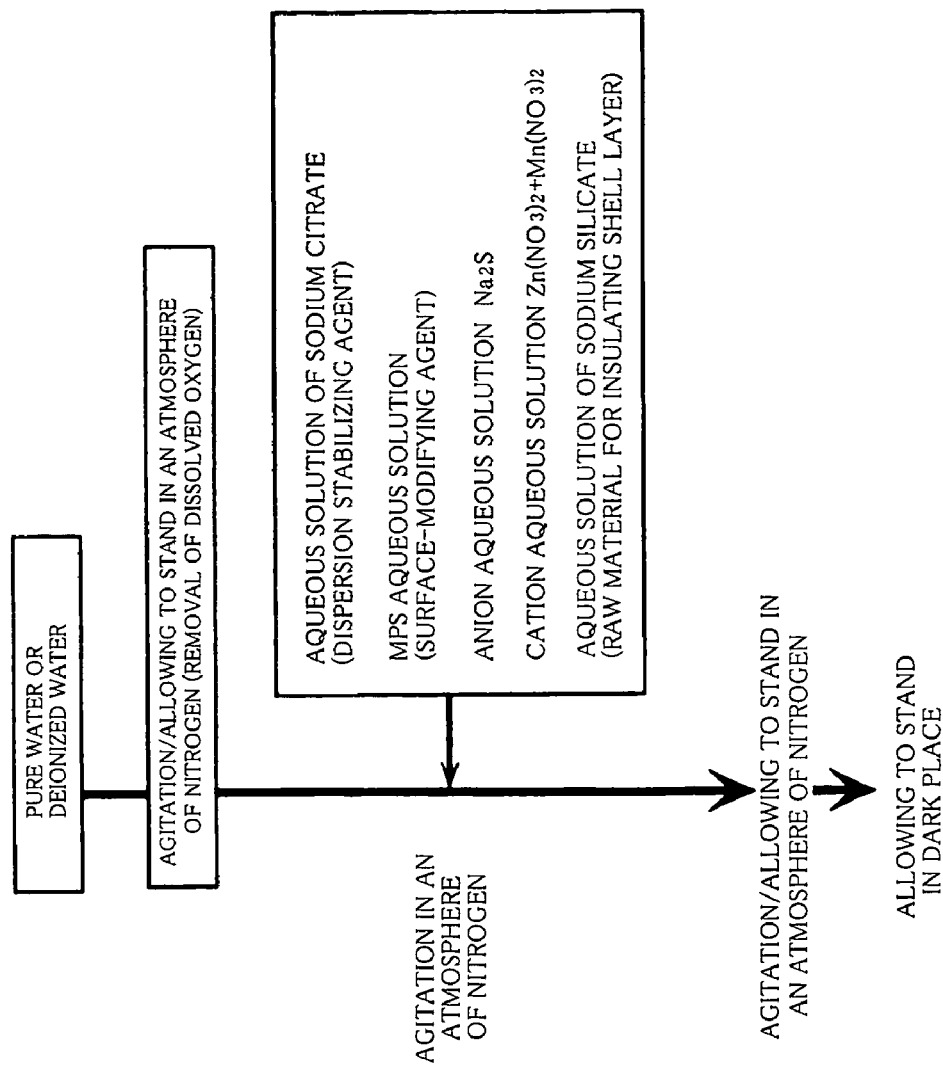
FIG. 1 is a flow chart showing the production method of the present invention.
Figure 2:
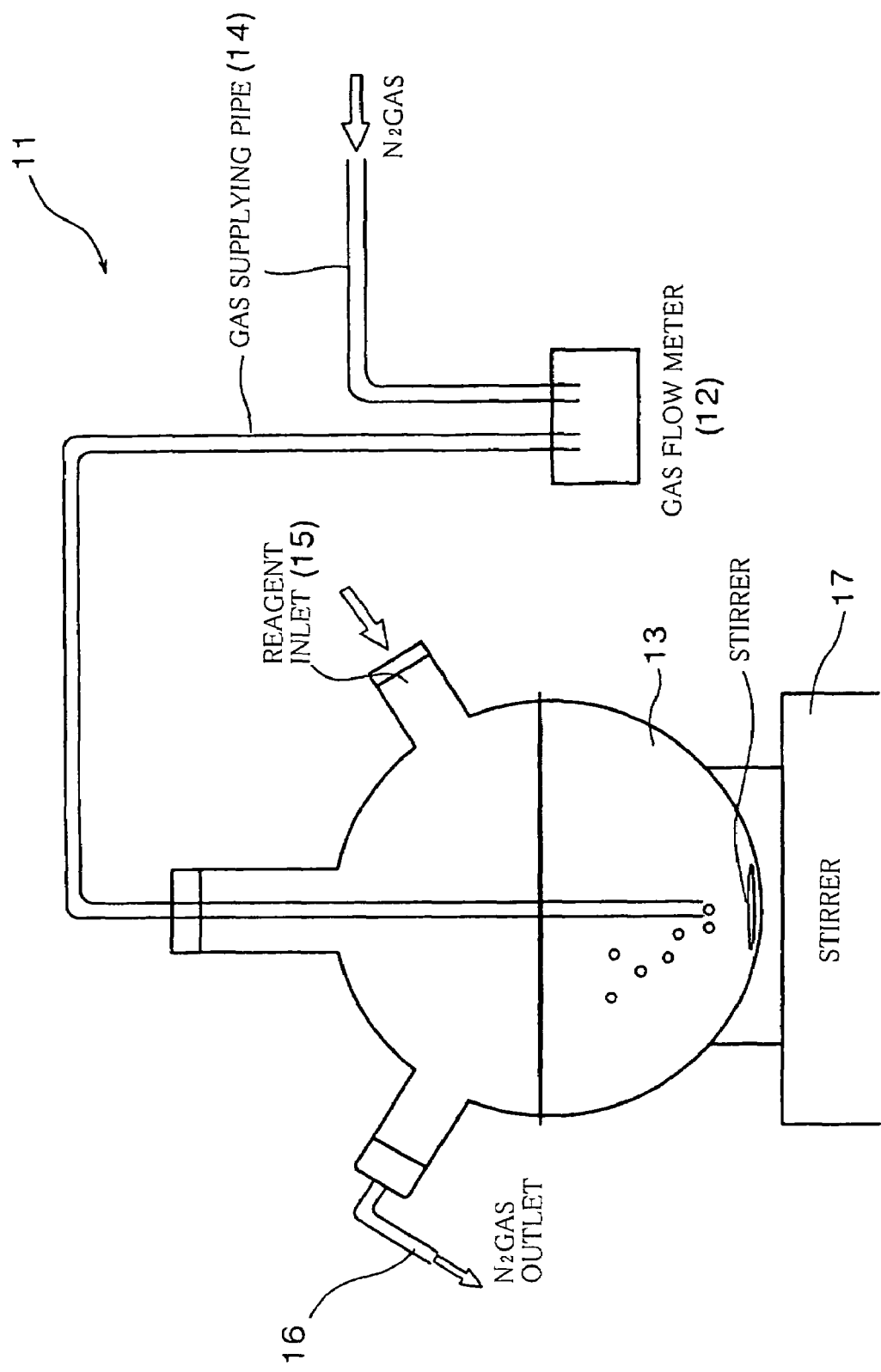
FIG. 2 is a schematic illustration showing a production apparatus used in the production method of the present invention.
Figure 3:
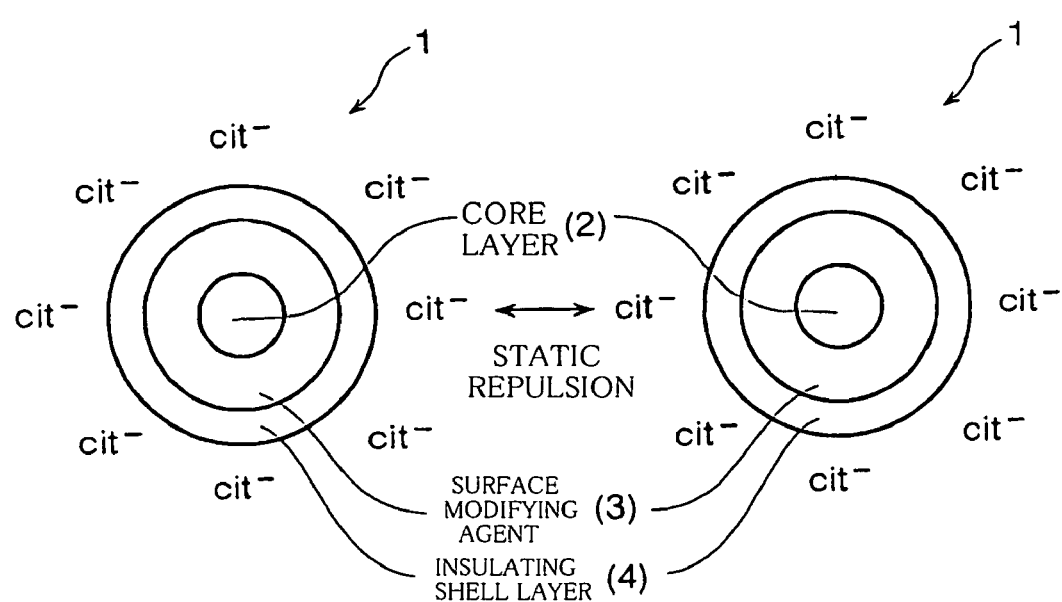
FIG. 3 is a pictorial view showing a state of repulsion of phosphor particle of the present invention.

A method of preparing a nano-crystal phosphor which is a typical example of the nano-crystal particles of the present invention is described below:

FIG. 1 is a flow chart showing a method of preparing a nano-crystal phosphor and another composite nano-particle of the present invention. FIG. 2 is a schematic illustration showing a production apparatus used in the production method of the present invention. FIG. 3 is a pictorial view showing a nano-crystal phosphor and another composite nano-particle of the present invention and showing a state of repulsion of phosphor particle and another composite nano-particle.

The nano-crystal phosphor 1 which is a typical example of the composite nano-crystal particles of the present invention is a phosphor which can be formed by the afore-mentioned co-precipitation method. And the phosphor particle is a sulfide phosphor containing sulfur as a matrix selected from, for example the group consisting of ZnS:Mn, ZnS:Cl, ZnS:Cu, Al, ZnCdS:Ag, Cl, CaS:Eu, CaS:Ce, CaS:Mn, CaS:Cu, CaS: Sb, CaS:Eu, Ce, CaS:Sm, CaS:Pb, CaS:Gd, CaS:Tb, CaS:Dy, CaS:Ho, CaS:Er, CaS;Tm, CaS;Yb, MgS:Eu, MgS:Ce, MgS: Mn, SrS:Eu, SrS:Ce, SrS;Mn, BaS:Eu, BaS:Ce and BaS:Mn. As shown in FIG. 1, the nano-crystal phosphor 1 is composed of three parts comprising; a core part having the core layer 2 comprising a nano-sized phosphor particle, a surface-modifying part having the surface-modifying layer 3 so formed as to coat the surface of the core layer 2, and an insulating shell part having the insulating shell layer 4 so formed as to coat the surface of the surface-modifying layer 3. And the core layer 2 of the nano-crystal phosphor 1 and the surface-modifying layer 3 are formed simultaneously by a co-precipitation method in the presence of a dispersion-stabilizing agent and a surface-modifying agent. At this time, the core layer 2 and the surface-modifying layer 3 are bonded firmly each other. Thereafter, allowing to stand in a given period (for example, seven days and above), the insulating layer 4 is formed on the surface of the surface-modifying layer 3.

When forming 4 the phosphor by the afore-mentioned co-precipitation method, a metallic salt having two carboxyl groups or above is used as a dispersion-stabilizing agent. Specifically, sodium citrate having three carboxylic groups and an alkaline metal salt of dicarboxylic acid such as oxalic acid, malonic acid, fumaric acid, etc. are used.

As a surface-modifying agent are used a metallic compound having SH group at an end, for example an organosilicon compound, organoaluminum compound or organotitanium compound. The organosilicon compound is illustrated by the general formula $(R_1O)(R_2O)(R_3O)Si-R_4-SH$ (wherein each of $R_1$, $R_2$, $R_3$ and $R_4$ is an alkyl group). Specifically, 3-mercaptopropyltrimethoxysilane (MPS) illustrated by the formula 1 is exemplified.

Next, the apparatus 11 shown in FIG. 2 for production of the crystal phosphor 1 of the present invention is explained below: As shown in FIG. 2, the production apparatus 11 comprises the reactor 13 equipped with the gas supplying pipe 14 introducing nitrogen gas via the gas flow meter 12, and inside the reactor 13 is maintained in an atmosphere of nitrogen. The reactor 13 is equipped with the reagent inlet 15, the nitrogen gas outlet 16. The inside of the reactor 13 is adapted to be agitated by the stirrer 17.

When the nano-crystal phosphor 1 is synthesized by the use of the production apparatus 11, the procedures described in the flow chart shown in FIG. 1 are performed. First, a given amount of pure water or deionized water is poured into the reactor 13, into which is introduced nitrogen gas at rate of 300 cm$_3$/min for a given time while agitating with the stirrer 17 to remove dissolved oxygen in the pure water, allowing to stand in an atmosphere of nitrogen.

Next, the inside of the afore-mentioned reactor 13 is maintained in an atmosphere of nitrogen and 1-10 wt % of aqueous solution of sodium citrate having carboxylic groups of two or above is added as a dispersion-stabilizing agent. Then, 40-400 mM aqueous solution of 3-mercaputpropyl trimethoxy silane (MPS) is added as a surface-modifying agent. Then, an anion aqueous solution and a cation aqueous solution are added so as to be a given ratio (for example, anion:cation=1:1). At this time, it is preferable to add the anion aqueous solution and then cation aqueous solution, in that order.

As an anion material are used, for example sodium sulfide, thiourea, etc. As a cation material is used, for example a metallic salt containing zinc, manganese, etc. A salt of inorganic acid containing zinc is exemplified by zinc nitrite, zinc chloride, zinc sulfate, zinc phosphate, zinc perchlorate, zinc thiocyanate, zinc iodate, etc. A salt of organic acid containing zinc is exemplified by zinc acetate, zinc oxalate, zinc formate, zinc laurate, zinc lactate, zinc oleate, zinc caprylate, zinc salicylate, zinc stearate, zinc citrate, zinc benzoate, zinc propionate, zinc palmitate, zinc myristate, zinc tartrate, etc. A salt of inorganic acid containing manganese is exemplified by manganese nitrate, manganese chloride, manganese sulfate, manganese hydrogenphosphate, manganese perchlorate, manganese thiocyanate, etc. A salt of organic acid containing manganese is exemplified by manganese acetate, manganese oxalate, manganese formate, manganese laurate, manganese laurate, manganese lactate, manganese oleate, manganese caprylate, manganese salicylate, manganese stearate, etc.

Next, 0.4-5.4 wt % of an aqueous solution of sodium silicate as a raw material of silica for the insulating shell layer 4 is added and allowed to stand in the dark place in an atmosphere of nitrogen after agitation.

The afore-mentioned sodium citrate as a dispersion-stabilizing agent is diissociated in an aqueous solution to form three sodium ions (Na+) and citrate ion having three COO$^-$ negative ions as shown in chemical formula 2.

(Chemical formula 2)

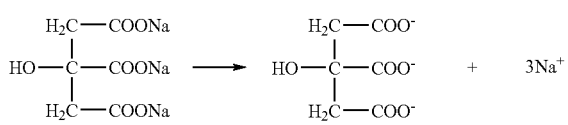

And, the afore-mentioned negative citrate ion is adsorbed on the surface of the phosphor or another nano-crystal synthesized in high concentration by virtue of the reaction of the anion with the cation as raw materials, and the surface of the nano-crystal is covered with negative ions to impart an electric charge. Thereby, the dispersibility of the solution increases due to the static repulsion of the nano-crystals. Therefore, aggregation of the nano-crystal does not occur. Accordingly, the sodium citrate has an action for enhancing the dispersibility of the nano-particle as a surface-stabilizing agent.

The afore-mentioned sodium citrate is adsorbed on the surface of the nano-crystal covered with the surface-modifying part as a surface-modifying layer and/or the insulating shell part as an insulating shell layer and the surface of composite nano-particle is covered with negative ions to impart an electric charge as shown in FIG. 3. Thereby, the dispersibility of the solution increases due to the static repulsion of the composite nano-particles. Therefore, aggregation of the composite nano-particles does not occur. Accordingly, the sodium citrate has an action for enhancing the dispersibility of the composite nano-particles as a surface-stabilizing agent.

As the dispersion-stabilizing agent, an alkaline metal salt of dicarboxylic acid such as oxalic acid, malonic acid, fumaric acid, etc can be used other than the above-described sodium citrate.

When an alkaline metal salt of oxalic acid is used as a dispersion-stabilizing agent, the alkaline metal salt of oxalic acid is diissociated in an aqueous solution to form two alkaline metal ions + and oxalate ion having two COO$^-$ negative ions of citrate ion -(CIT$^-$) as shown in chemical formula 3. M in the chemical formula 3 means an alkaline metal.

(Chemical formula 3)

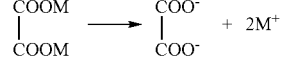

When an alkaline metal salt of malonic acid is used as a dispersion-stabilizing agent, the alkaline metal salt of malonic acid is diissociated in an aqueous solution to form two alkaline metal ions + and malonate ion having two COO$^-$ negative ions as shown in chemical formula 4. M in the chemical formula 4 means an alkaline metal.

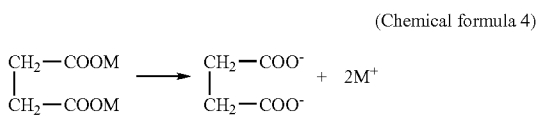

(Chemical formula 4)

When an alkaline metal salt of fumaric acid is used as a dispersion-stabilizing agent, the alkaline metal salt of fumaric acid is diissociated in an aqueous solution to form two alkaline metal ions + and fumarate ion having two COO⁻ negative ions as shown in chemical formula 5. M in the chemical formula 5 means an alkaline metal.

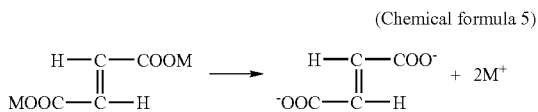

(Chemical formula 5)

When sodium oxalate is used as a dispersion-stabilizing agent, the sodium oxalate is diissociated in an aqueous solution to form two sodium ions (Na+) and oxalate ion having two COO⁻ negative ions as shown in chemical formula 6.

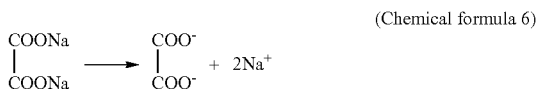

(Chemical formula 6)

When sodium malonate is used as a dispersion-stabilizing agent, the sodium malonate is diissociated in an aqueous solution to form two sodium ions (Na+) and malonate ion having two COO⁻ negative ions as shown in chemical formula 7.

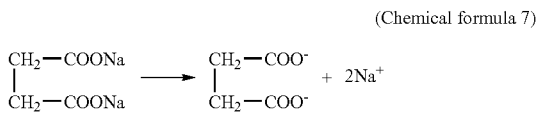

(Chemical formula 7)

When sodium fumarate is used as a dispersion-stabilizing agent, the sodium fumarate is diissociated in an aqueous solution to form two sodium ions (Na+) and fumarate ion having two COO⁻ negative ions as shown in chemical formula 8.

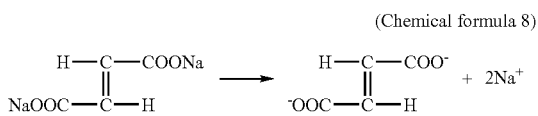

(Chemical formula 8)

As describe above, also when an alkaline metal salt of dicarboxylic acid such as oxalic acid, malonic acid, fumaric acid, etc is used as the dispersion-stabilizing agent, negative ions are adsorbed on the surface of nano-particles of phosphor similarly to the afore-mentioned sodium citrate and the surface of nano-particles is covered with negative ions to impart an electric charge. Consequently, the same effect can be obtained as that when using sodium citrate.

Next, the surface modification by MPS and mechanism of the formation of SiO2 are described.

MPS is diissociated in an aqueous solution to form MPS having S⁻ at the terminal group SH as shown in chemical formula 9. It is thought that the S⁻ group forms chemical bonds with $Zn^{2+}$ and $Mn^{2+}$ on the upper surface of the nano-particle of ZnS:Mn phosphor. Thereby, very strong bonds are formed between MPS and ZnS:Mn phosphor particles differently from conventional reversible adsorption in which adsorption and desorption are repeated, and, as a result, the surface-modifying part as s surface-modifying layer is formed.

(Chemical formula 9)

Si as shown in chemical formula 10.

(Chemical formula 10)

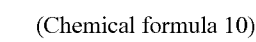

The OH group of MPS is subjected to a condensation-polymerization with OH group present at a terminal group of sodium citrate (water glass) as shown in chemical formula 11 to coat the surface of the surface-modifying layer 3 of phosphor particle with the insulating part of the insulating layer 4 composed of glass containing $SiO_2$ as a main component.

(Chemical formula 11)

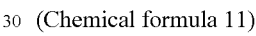
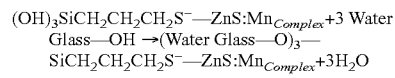

The insulating part of the insulating layer 4 may be formed from a material which can be formed in a film thickness having transparency. Specifically, a transparent material comprising as a main component a compound selected from the group consisting of SiO, $SiO_2$, SiN, SiON, $Si_3N_4$, $Al_2O_3$ and $TiO_2$ is used as a raw material of the insulating layer 4. When any one of such a transparent material as described above is used, it is possible to synthesize a nano-crystal by the above-described method.

As described above, the sodium citrate acts so as to enhance the dispersibility of the nano-particle of $ZnS:Mn^{2+}$ as a surface-stabilizing agent. While MPS as a surface-modifying agent modifies the surface of phosphor by a SH substituent at a terminal group and acts as a starting material for the formation of silica, the effect of stabilization of dispersion is weak by the use of MPS alone. Therefore, the core layer 2 of nano-crystal phosphor 1 and the surface-modifying layer 3 are formed simultaneously by the co-precipitation method in the presence of both MPS as a surface-modifying agent and sodium citrate as a dispersion-stabilizing agent, and the surface of the nano-particle thus formed is further coated with the insulating shell layer 4. Thereby, it is possible to synthesize the nano-crystal phosphor of $ZnS:Mn^{2+}/SiO_2$. The nano-crystal phosphor 1 comprising the composite nano-particles thus synthesized maintains a stable state of suspension within a period from several weeks to several months and does not bring about aggregation.

According to the synthesis of nano-crystal phosphor by the co-precipitation method, the nano-particle is synthesized in the presence of both a surface-modifying agent and a dispersion-stabilizing agent, and the particle is coated with a surface-modifying agent and $SiO_2$ simultaneously when the particle is formed. Thereby, a synthetic method having high productivity is established in which each of particles is dispersed in high concentration in suspension stably and individually.

By coating a nano-crystal phosphor with an inorganic substance according to the present invention, the quantum confined effect and prevention of possible degradation can be obtained at the same time and the increase in emission efficiency can be obtained by capping the surface defect by virtue of surface modification.

The present inventors have further studied devotedly the method of prevention of aggregation of composite nano-particle. As a result, the present inventors have found that a composite nano-particle which has good dispersibility and does not bring about aggregation can be obtained by adding sodium citrate, MPS, anion and cation, in that order. A film of silica about 1 nm in thickness is formed on the surface of the composite nano-particle.

Figure 8:
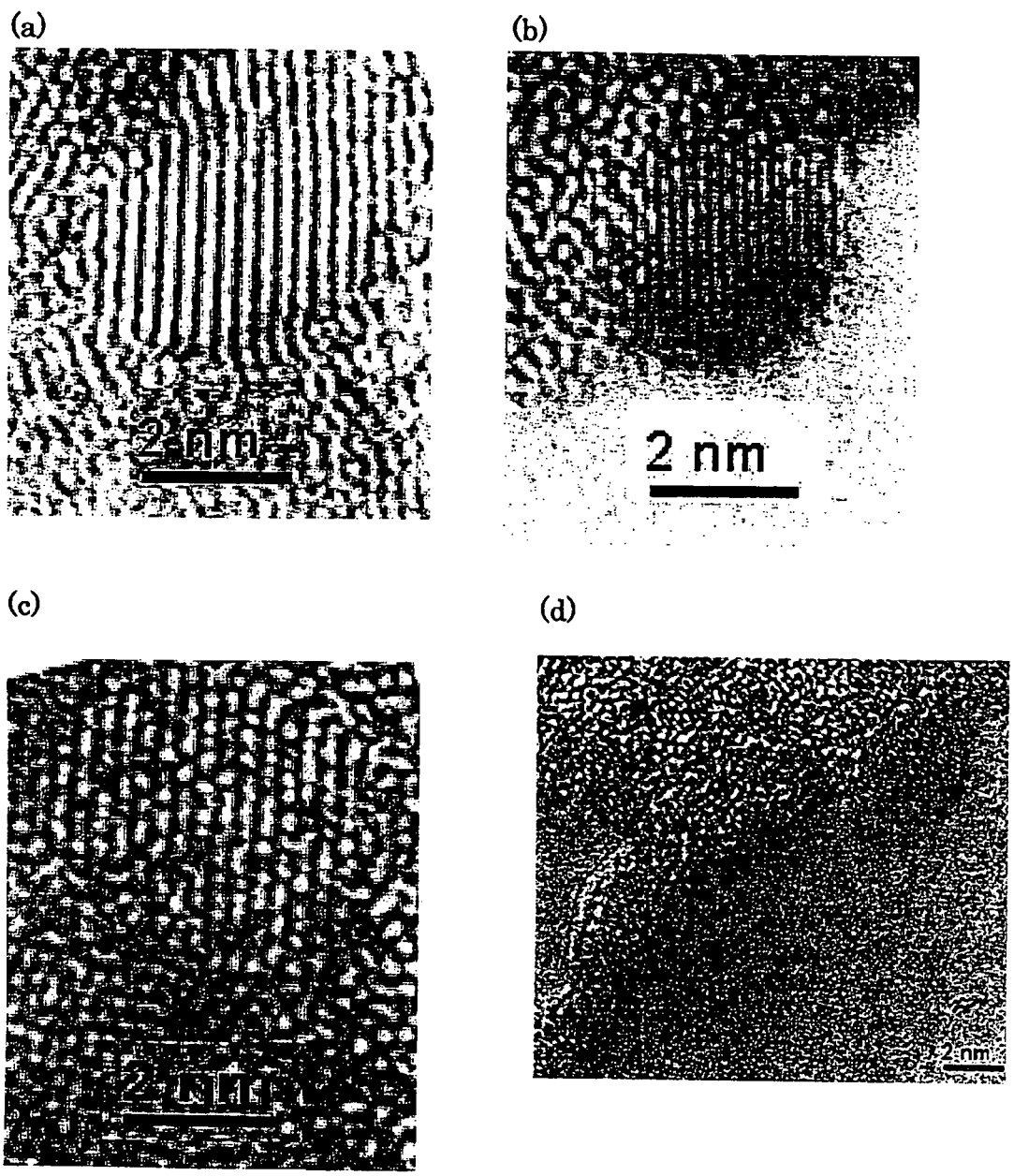
FIG. 8 is a photograph (Transmission Electron Microscope) substituted for a drawing of ZnS:Mn phosphor of the present invention.

FIG. 8 (a) (b) and (c) are micrographs of transmission electron microscope and show particles having a particle diameter of (a) 3.6 nm, (b) 2.9 nm and (c) 4.4 nm, respectively. Lattice spacings of particles are (a) 0.24 nm, (b) 0.16 nm and (c) 0.26 nm, respectively. (a) belongs to the wurtzite structure (102), (b) belongs to the wurtzite structure (201) and (c) belongs to the wurtzite structure (106). Therefore, the single crystal structure of ZnS:$Mn^{2+}$ is the wurtzite structure. By FIG. 8(d), it is confirmed that a film of silica about 1 nm in thickness is formed on the surface of the composite nano-particle.

It is, therefore, evident that a phosphor ZnS:$Mn^{2+}$ synthesized by the method of preparing a composite nano-particle comprising steps of (a) forming at the same time the core part of a composite nano-particle of the present invention and the surface-modifying part coating the surface of the core part to modify the surface by the co-precipitation method in the presence of both a dispersion-stabilizing agent and a surface-modifying agent, and (b)forming a nano-sized insulating part on the surface of the surface-modifying layer constitutes nano-crystal.

As shown in FIG. 3, the afore-mentioned composite nano-particle maintains a state of extremely stable dispersion and was not deposited with the passage of time. A significantly stable ZnS:$Mn^{2+}$ nano-particle is formed by adding both sodium citrate and MPS. The sodium citrate added as a dispersion-stabilizing agent is diissociated in an aqueous solution to form three Na+ ions and citrate ion having three $COO^-$ ions. Since the citrate ion having three $COO^-$ ions is adsorbed on the particle of phosphor to impart negative electric charge, the dispersibility of solution is increased due to static repulsion. SH at the end of MPS chemically bonds to ZnS:Mn nano-particle surface and has the function of prevention of the direct contact of nano-particles.

A sample having good dispersibility could be synthesized by the use of MPS alone. However, surface-modification and depression of the growth of particle by MPS were performed by addition of sodium citrate. Consequently, the effect of stabilization was enhanced.

Immediately after synthesize, the absorption spectrum shows a small change and is concentrated. From these facts, it is evident that the growth and aggregation of particles hardly occur. Band-gap energy Eg was 4.13 eV, ΔEg=0.55 eV, particle diameter was 2.7 nm.

By stopping the growth of $SiO_2$ layer of ZnS:$Mn^{2+}$/$SiO_2$ core shell-type nano-crystal produced by the afore-mentioned production method, composite nano-particles having good dispersibility and little aggregation can be obtained.

In the afore-mentioned co-precipitation method, coat of $SiO_2$ was hard to perform in a monodisperse system of phosphor particles. The method proposed by the present invention uses sodium citrate as a dispersion-stabilizing agent in a reaction solvent, and S-defects on the surface of the phosphor are associated with 3-mercaptopropyltrimethoxysilane (MPS) as a surface-modifying agent in state where the sodium citrate is dispersed. MPS thus associated is further bonded each other and forms a network of $SiO_2$ and is grown. Therefore, at an initial stage of reaction, particles of monodisperse system of ZnS:$Mn^{2+}$/$SiO_2$ core shell-type nano-crystal phosphor can be formed.

Since, however, MPS accelerates the reaction of ZnS:$Mn^{2+}$/$SiO_2$ core shell per se, there has been a problem that the shells are bonded each other.

As a countermeasure against such a problem: If chlorotrimethylsilane [ClSi $(CH_3)_3$] is added, it is reacted with an unreacted silanol group ($H_n$Si $(OH)_{4-n}$) to form a linkage (—Si—O—Si $(CH_3)_3$). Therefore, the reaction of an unreacted silanol group is terminated by introduction of methyl groups. Accordingly, the vitrification for inhibiting the reaction of unreacted silanol group can be suppressed.

As a result, aggregation of phosphor does not occur after elapse of long time and it has been possible to obtain a shell layer having a desired thickness.

MPS is easy to bond to the surface of sulfide phosphor, but hard to bond to the surface of oxide or nitride. Trimethoxysilane having HO— or HN— is easier to bond the surface of oxide or nitride than MPS.

For example, it is preferable to use 3-aminopropyltriethoxysilane for an oxide such as GaN, InN, ZnO:Zn, SrTiO3:$Pr^+$, etc. Each of them may be bonded to $Na^+$ etc.

DESCRIPTION OF THE PREFERRED EMBODIMENTS FOR CARRYING OUT THE INVENTION

Into a reactor 13 shown in FIG. 2 are added 90 $cm^3$ of deionized water and then added nitrogen gas at a flow rate of 300 $cm^3$/min through the gas supplying pipe 14. Nitrogen gas flow is carried out for 90 minutes before reaction. The present inventors have found that good state of dispersion can be obtained by adding reagents such as a dispersion-stabilizing agent, a surface-modifying agent, a cation material, an anion material and a glass material (silica material) in that order through the reagent inlet 15 into the deionized water with stirring by the stirrer 17.

EXAMPLE 1

Into the reactor 13 shown in FIG. 2 are added 0.5 $cm^3$ of 10 wt % aqueous solution of sodium citrate, then added 1.0 $cm^3$ of 400 mM aqueous solution of MPS as a surface-modifying agent. Then, into the reactor 13 are added 5.0 $cm^3$ of 0.08M aqueous solution of $Na_2S$ as an anion material and 3.6 $cm^3$ of 0.1M aqueous solution of Zn($NO_3$)$_2$ and 0.4 $cm^3$ of 0.1M aqueous solution of Mn(NO3)$_2$ as cation materials, in that order. Next, 4.0 $cm^3$ of 5.4 wt % aqueous solution of sodium silicate as a glass material containing $SiO_2$ as a main component are added into the reactor 13 and agitated to allow to react with each other. After completion of the reaction, nitrogen gas flow was carried out for 90 minutes.

Thereby, phosphor particles of ZnS:$Mn^{2+}$/$SiO_2$ are dispersed in the reactor 13. The phosphor particles of ZnS:$Mn^{2+}$/$SiO_2$ dispersed in the reactor 13 maintain stable suspension after fourteen days elapsed and did not bring about aggregation. That is to say, the phosphor particles are not sedimented in the reactor 13, and it is presumed that the particles dispersed in the reactor 12 are nano-sized ones.

Figure 4:
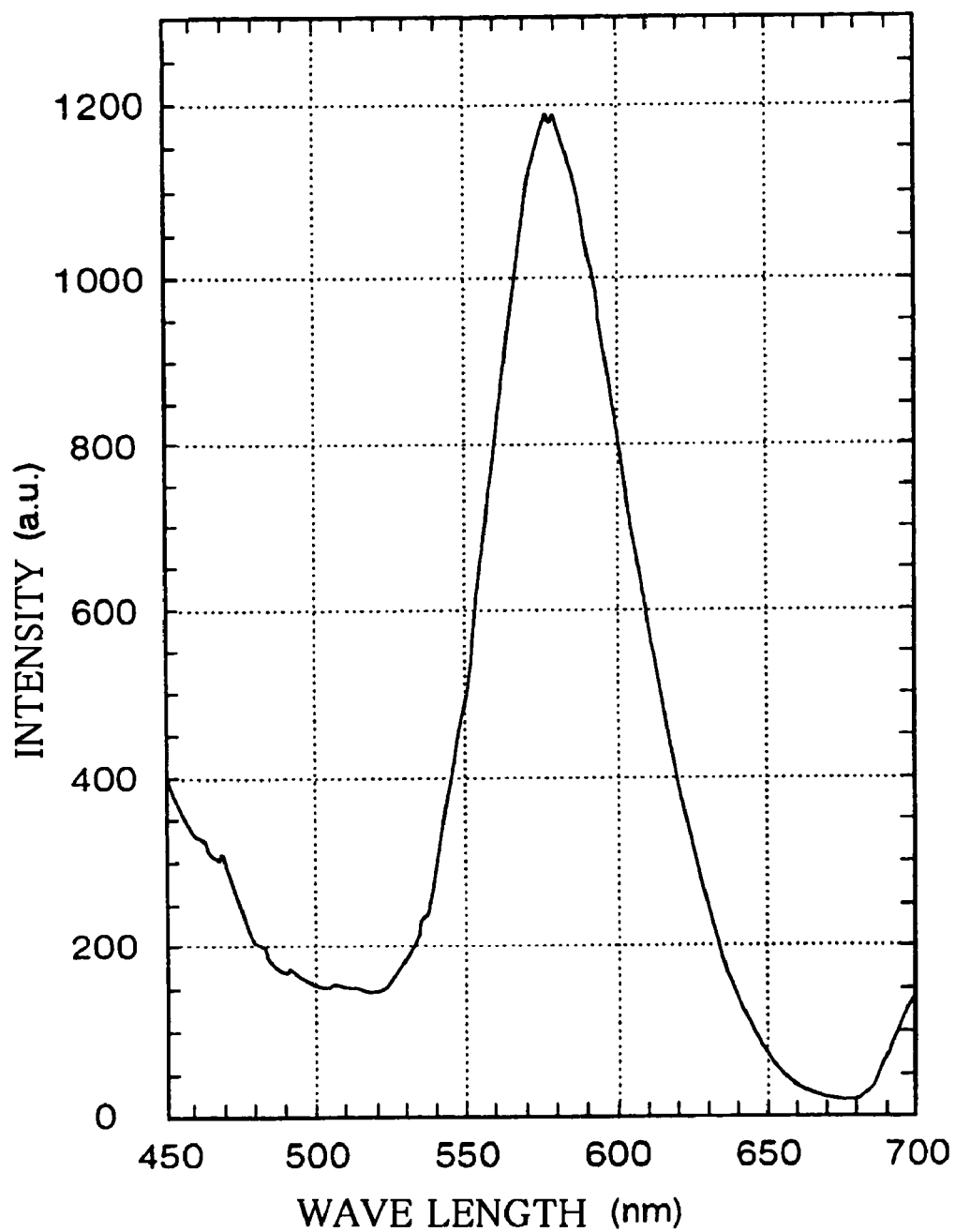
FIG. 4 is an emission spectrum by ultraviolet ray excitation of a nano-sized phosphor of the present invention.

The light emission spectrum obtained when $ZnS:Mn^{2+}/SiO_2$ phosphor in suspension is allowed to emit light by ultraviolet rays is shown in FIG. 4.

When phosphor particles were synthesized without addition of an aqueous solution of sodium citrate as a dispersion-stabilizing agent in the above-described steps, it was observed that particles dispersed in the reactor 13 were precipitated immediately after being synthesized. That is to say, when a dispersion-stabilizing agent is not added, it is not possible to prevent the aggregation of particles and maintain a stable state of suspension.

Nano-sized phosphor particles which do not precipitate and are dispersed in stable suspension in the reactor 13 are sedimented by a centrifugal separator to collect and dried at a temperature of 50° C. Thereby, nano-crystal $ZnS:Mn/SiO_2$ powder was obtained.

An anion material and a cation material as raw materials for a phosphor other than ZnS:Mn are described below. Synthesis of an insulating shell part comprising $SiO_2$ and another insulating layer using the materials described below are the same as the case when $ZnS:Mn^{2+}/SiO_2$ is used.

EXAMPLE 2

Example 2 relates to a case where a core part of composite nano-particle is $CaS:Eu^{2+}$ (red color).

Anion material—sodium sulfide, thiourea

Cation material—metallic salt containing calcium and europium

Examples of salts of inorganic acid containing calcium—calcium nitrate, calcium chloride, calcium sulfide, calcium phosphate, calcium thiocyanate, and hydrates thereof Examples of salts of organic acid containing calcium—calcium acetate, calcium oxalate, calcium formate, calcium lactate, calcium oleate, calcium salicylate, calcium stearate, calcium citrate, calcium benzoate, calcium propionate, calcium palmitate, calcium tartrate, calcium 2-ethylhexanoate, calcium ethylenediamine tetraacetate, and hydrates thereof Examples of salts of inorganic acid containing europium—europium chloride, europium nitrate, and hydrates thereof Examples of salts of organic acid containing europium—europium acetate, europium oxalate, and hydrates thereof

EXAMPLE 3

Example 3 relates to a case where a core part of composite nano-particle is $CaS:Ce^{3+}$ (green color).

The same procedures as those of Examples 1 and 2 were repeated except that the following materials were used.

Anion material—sodium sulfide, thiourea

Cation material—metallic salt containing calcium and cerium

Examples of salts of inorganic acid containing cerium—cerium chloride, cerium nitrate, and hydrates thereof Examples of salts of organic acid containing cerium—cerium acetate, cerium oxalate, cerium trifluoromethanesulfonate, and hydrates thereof

EXAMPLE 4

Example 4 relates to a case where a core part of composite nano-particle is $CaS:Mn^{2+}$ (orange or amber color).

The same procedures as those of Examples 1 and 2 were repeated except that the following materials were used.

Anion material—sodium sulfide, thiourea

Cation material—metallic salt containing calcium and manganese

Examples of salts of inorganic acid containing manganese—manganese chloride, manganese nitrate, manganese sulfide, manganese hydrogenphosphate, manganese perchlorate, manganese thiocyanate, and hydrates thereof Examples of salts of organic acid containing manganese—manganese acetate, manganese oxalate, manganese formate, manganese laurate, manganese lactate, manganese oleate, manganese caprylate, manganese salicylate, manganese stearate, and hydrates thereof

EXAMPLE 5

Example 5 relates to a case where a core part of composite nano-particle is $CaS:Cu^+$ (purple color).

The same procedures as those of Examples 1 and 2 were repeated except that the following materials were used.

Anion material—sodium sulfide, thiourea

Cation material—metallic salt containing calcium and copper

Examples of salts of inorganic acid containing copper—copper chloride, copper nitrate, copper sulfide, copper bromide, copper iodide, copper pyrophosphate, and hydrates thereof Examples of salts of organic acid containing copper—copper acetate, copper oxalate, copper trifluoromethanesulfonate, copper benzoate, copper acetylacetonate, copper benzoylacetonate, copper citrate, copper 2-ethylhexanoate, copper formate, copper oleate, copper phthalocyanine, copper stearate, copper ethylenediamine tetraacetate, and hydrates thereof

EXAMPLE 6

CaS:Sb described below can be obtained by using the following dopant (contaminant).

Salts of inorganic acid containing antimony—antimony chloride, antimony sulfide, antimony pentafluoride, $CaS:Eu^{2+}$, $CaS:Eu^{2+}$, $Ce^{3+}$ Salts of inorganic acid containing europium—europium chloride, europium nitrate, and hydrates thereof Salts of organic acid containing europium—europium acetate, europium oxalate, and hydrates thereof Salts of inorganic acid containing cerium—cerium chloride, cerium nitrate, cerium sulfide, and hydrates thereof Salts of organic acid containing cerium—cerium acetate, cerium oxalate, cerium trifluoromethanesulfonate, and hydrates thereof $CaS:Sm^{3+}$ Salts of inorganic acid containing samarium—samarium chloride, samarium nitrate, samarium iodide Salts of organic acid containing samarium—samarium acetylacetonate, $CaS:Pb^{2+}$ Salts of inorganic acid containing lead—lead bromide, lead chloride, lead iodide, lead nitrate, lead phosphate, lead sulfide Salts of organic acid containing lead—lead acetate, lead citrate, lead maleate, lead naphthenate, lead oleate, lead stearate, di-i-propoxy lead $CaS:Gd^{3+}$ Salts of inorganic acid containing gadolinium—gadolinium chloride, gadolinium nitrate, gadolinium sulfide Salts of organic acid containing gadolinium—gadolinium oxalate, tri-i-propoxy gadolinium CaS:Tb$^{2+}$ Salts of inorganic acid containing terbium—terbium chloride, terbium nitrate, terbium sulfide Salts of organic acid containing terbium—terbium oxalate CaS:Dy$^{3+}$ Salts of inorganic acid containing dysprosium—dysprosium nitrate, dysprosium chloride, dysprosium sulfide Salts of organic acid containing dysprosium—dysprosium tris (2,2,6,6-tetramethyl-3,5-heptandionate, dysprosium oxalate, tri-i-propoxy dysprosium CaS:Ho$^{3+}$ Salts of inorganic acid containing holmium—holmium chloride, holmium nitrate, holmium sulfide Salts of organic acid containing holmium—holmium oxalate CaS:Er$^{3+}$ Salts of inorganic acid containing erbium—erbium chloride, erbium nitrate, erbium sulfide Salts of organic acid containing erbium—erbium acetylacetonate, erbium isopropoxide, tris (cyclopentadienyl) erbium, erbium oxalate, tri-i-propoxy erbium CaS:Tm$^{3+}$ Salts of inorganic acid containing thulium—thulium chloride, thulium nitrate, thulium sulfide Salts of organic acid containing thulium—thulium trifluoromethanesulfonate, thulium oxalate CaS:Yb$^{3+}$ Salts of inorganic acid containing ytterbium—ytterbium chloride, ytterbium iodide, ytterbium nitrate Salts of organic acid containing ytterbium—ytterbium acetate, ytterbium tris (2,2,6.6-tetramethyl-3,5,hepheptanedionate), tri-i-propoxy ytterbium

EXAMPLE 7

Example 7 relates to a case where a core part of composite nano-particle is MgS:Eu$^{2+}$ (orange color).

The same procedures as those of Examples 1 and 2 were repeated except that the following materials were used.

Anion material—sodium sulfide, thiourea

Cation material—metallic salt containing magnesium and europium

Examples of salts of inorganic acid containing magnesium—magnesium nitrate, magnesium chloride, magnesium sulfide, magnesium phosphate, and hydrates thereof Examples of salts of organic acid containing magnesium—magnesium acetate, magnesium oxalate, magnesium lactate, magnesium oleate, magnesium stearate, magnesium benzoate, magnesium succinate, magnesium cyclohexanebutyrate, di-i-propoxy magnesium, and hydrates thereof Examples of salts of inorganic acid containing europium—europium chloride, europium nitrate, and hydrates thereof Examples of salts of organic acid containing europium—europium acetate, europium oxalate, and hydrates thereof

EXAMPLE 8

Example 8 relates to a case where a core part of composite nano-particle is MgS:Ce$^{3+}$ (green color).

The same procedures as those of Example 7 were repeated except that the following materials were used.

Anion material—sodium sulfide, thiourea

Cation material—metallic salt containing magnesium and europium

Examples of salts of organic acid containing cerium—cerium acetate, cerium oxalate, cerium trifluoromethanesulfonate, and hydrates thereof

EXAMPLE 9

Example 9 relates to a case where a core part of composite nano-particle is MgS:Mn$^{3+}$ (infrared).

The same procedures as those of Examples 1 and 2 were repeated except that the following materials were used.

Anion material—sodium sulfide, thiourea

Cation material—metallic salt containing magnesium and manganese

Examples of salts of inorganic acid containing manganese—manganese nitrate, manganese chloride, manganese sulfide, manganese hydrogenphosphate, manganese perchlorate, manganese thiocyanate, and hydrates thereof Examples of salts of organic acid containing manganese—manganese acetate, manganese oxalate, manganese formate, manganese laurate, manganese lactate, manganese oleate, manganese caprylate, manganese salicylate, manganese stearate, and hydrates thereof

EXAMPLE 10

Example 10 relates to a case where a core part of composite nano-particle is SrS:Eu$^{3+}$ (red color).

The same procedures as those of Examples 1 and 2 were repeated except that the following materials were used.

Anion material—sodium sulfide, thiourea

Cation material—metallic salt containing strontium and europium

Examples of salts of inorganic acid containing strontium—strontium nitrate, strontium chloride, strontium sulfide, and hydrates thereof Examples of salts of organic acid containing strontium—strontium acetate, strontium formate, strontium oxalate, strontium cyclohexanebutyrate, di-i-propoxy magnesium, and hydrates thereof Examples of salts of inorganic acid containing europium—europium chloride, europium nitrate, and hydrates thereof Examples of salts of organic acid containing europium—europium acetate, europium oxalate, and hydrates thereof

EXAMPLE 11

Example 11 relates to a case where a core part of composite nano-particle is SrS:Ce$^{3+}$ (green color).

The same procedures as those of Examples 1 and 2 were repeated except that the following materials were used.

Anion material—sodium sulfide, thiourea

Cation material—metallic salt containing strontium and europium

Examples of salts of inorganic acid containing strontium—strontium nitrate, strontium chloride, strontium sulfide, and hydrates thereof Examples of salts of organic acid containing strontium—strontium acetate, strontium formate, strontium oxalate, strontium cyclohexanebutyrate, di-i-propoxy magnesium, and hydrates thereof Salts of inorganic acid containing cerium—cerium chloride, cerium nitrate, cerium sulfide, and hydrates thereof Salts of organic acid containing cerium—cerium acetate, cerium oxalate, cerium trifluoromethanesulfonate, and hydrates thereof

EXAMPLE 12

Example 12 relates to a case where a core part of composite nano-particle is SrS:$Mn^{3+}$ (yellow color).

The same procedures as those of Example 11 were repeated except that the following materials were used.

Anion material—sodium sulfide, thiourea

Cation material—metallic salt containing strontium and manganese

Examples of salts of inorganic acid containing manganese—manganese nitrate, manganese chloride, manganese sulfide, manganese hydrogenphosphate, manganese perchlorate, manganese thiocyanate, and hydrates thereof Examples of salts of organic acid containing manganese—manganese acetate, manganese oxalate, manganese formate, manganese laurate, manganese lactate, manganese oleate, manganese caprylate, manganese salicylate, manganese stearate, and hydrates thereof

EXAMPLE 13

Example 13 relates to a case where a core part of composite nano-particle is BaS:$Eu^{3+}$ (orange color).

The same procedures as those of Example 11 were repeated except that the following materials were used.

Anion material—sodium sulfide, thiourea

Cation material—metallic salt containing barium and europium

Examples of salts of inorganic acid containing europium—europium chloride, europium nitrate, and hydrates thereof Examples of salts of organic acid containing europium—europium acetate, europium oxalate, and hydrates thereof

EXAMPLE 14

Example 14 relates to a case where a core part of composite nano-particle is BaS:$Ce^{3+}$ (bluish green color).

The same procedures as those of Examples 1 and 2 were repeated except that the following materials were used.

Anion material—sodium sulfide, thiourea

Cation material—metallic salt containing barium and cerium

Salts of inorganic acid containing cerium—cerium chloride, cerium nitrate, cerium sulfide, and hydrates thereof Salts of organic acid containing cerium—cerium acetate, cerium oxalate, cerium trifluoromethanesulfonate, and hydrates thereof

EXAMPLE 15

Example 15 relates to a case where a core part of composite nano-particle is BaS:$Mn^{2+}$ (yellow color).

The same procedures as those of Example 11 were repeated except that the following materials were used.

Anion material—sodium sulfide, thiourea

Cation material—metallic salt containing barium and manganese

Examples of salts of inorganic acid containing manganese—manganese nitrate, manganese chloride, manganese sulfide, manganese hydrogenphosphate, manganese perchlorate, manganese thiocyanate, and hydrates thereof Examples of salts of organic acid containing manganese—manganese acetate, manganese oxalate, manganese formate, manganese laurate, manganese lactate, manganese oleate, manganese caprylate, manganese salicylate, manganese stearate, and hydrates thereof Next, the phosphors prepared by Examples described above were mounted to a vacuum fluorescent display (VFD) to measure data on the emission characteristics by an electron beam. An anode was prepared by forming an anode conductor of aluminum on a glass substrate in a given pattern, and applying the afore-mentioned powder ZnS:$Mn^{2+}$/$SiO_2$ phosphor thereon. A control electrode of metal mesh was formed on the anode and a filament-like cathode was mounted thereon. A front container of glass comprising a frame-like side panel and front panel was sealed so as to enclose these electrodes. And, a flat box-type enclosure (housing) was formed of the substrate and front container, inside of which was evacuated to maintain vacuum.

Then, a cathode voltage of 1.8 Vdc is applied to a test ball having such a structure as described above, thereby making emit an electron from the filament-like cathode. A voltage of 12 V is applied to the metal mesh-like control electrode to accelerate the electron from the filament-like cathode, and the electron is made to collide with the phosphor of the anode. A voltage of 0 to 100 Vdc is applied to the anode to measure an anode current and emission luminance. The results obtained are shown in FIGS. 5 and 6

Figure 5:
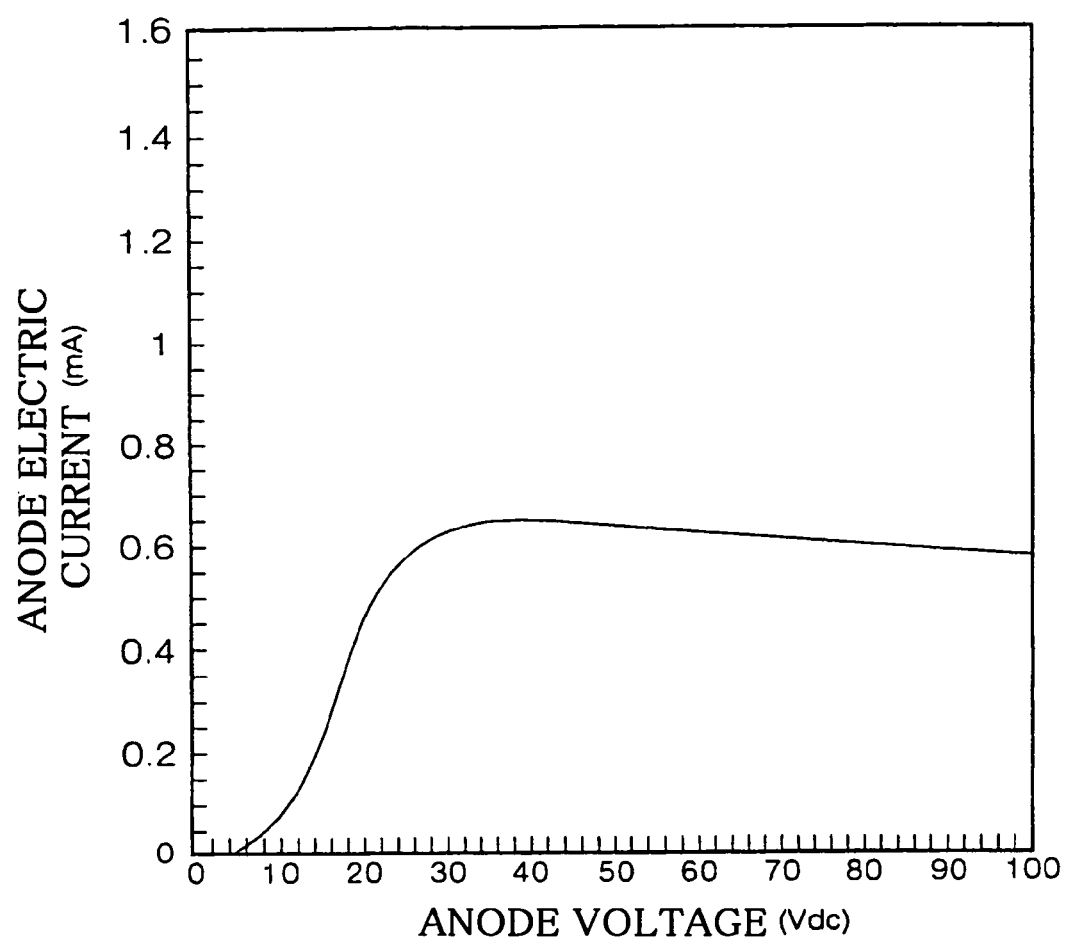
FIG. 5 is an electric current-voltage curve of a nano-sized phosphor of the present invention.
Figure 6:
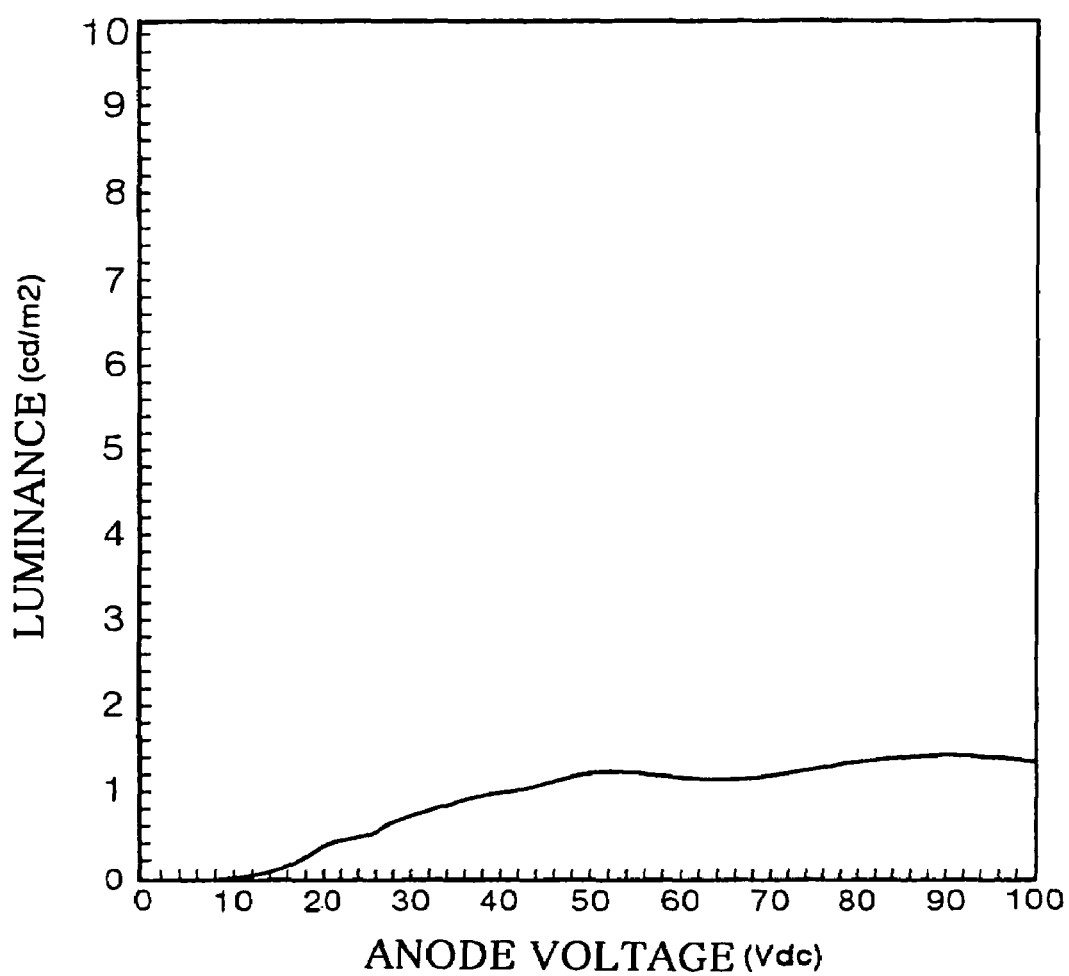
FIG. 6 is a graph showing the relationship between voltage and luminance of a nano-sized phosphor of the present invention.

It is evident from the results shown in FIGS. 5 and 6 that emission can be observed from approximately 10V and increases gradually up to 40V, but does not increase in 40V or above.

Figure 7:
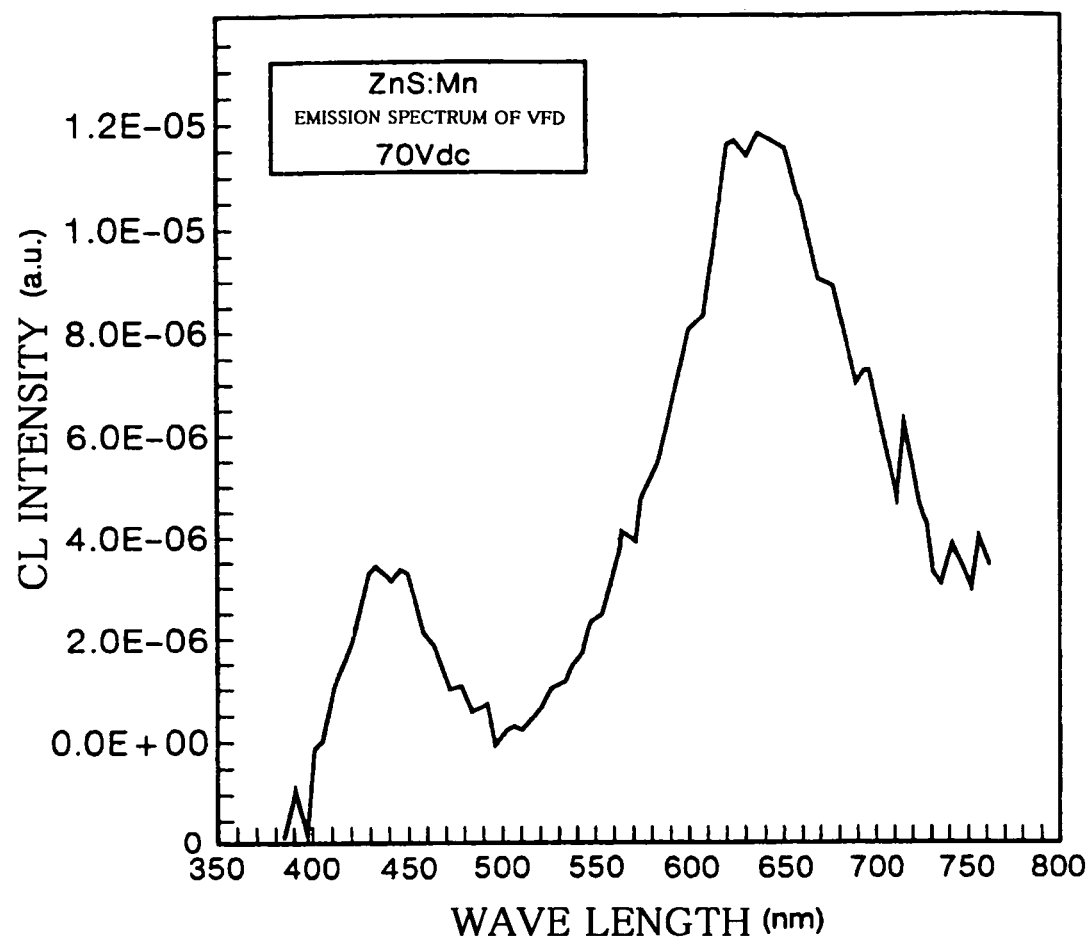
FIG. 7 is an emission spectrum by an electron beam excitation of a nano-sized phosphor of the present invention.

Next, the emission spectrum when a cathode voltage of 70 Vde is applied was measured. As show in the emission spectrum of FIG. 7, a main peak is observed in the vicinity of 640 nm and emission color of orange was observed.

As described above, according to the method of preparing a nano-crystal phosphor of the present invention, nano-particles which do not aggregate and are dispersed in stable emulsion are synthesized by synthesizing phosphor particles by the method of co-precipitation in the presence of both a surface-modifying agent and a dispersion-stabilizing agent.

Even when a sample is powder, it is possible to prevent mutual contact of phosphor particles and obtain quantum confined effect by the use of a glass material (silica material: shell layer-forming material) comprising $SiO_2$ as a main component.

When the coating of a phosphor particle with a glass material comprising $SiO_2$ as a main component is carried not simultaneously when the phosphor is synthesized, but after the phosphor is allowed to stand for a given period (for example, one week), the optimum emission intensity can be obtained. Furthermore, it is possible to inhibit the deterioration by light by coating the phosphor particle with the above-described glass material.

While in the above-described examples, an explanation is given on the core-layer of nano-crystal phosphor made up of phosphor particles of ZnS:Mn, it is possible to synthesize a nano-crystal phosphor 1 having a three-layer structure (core layer 2, surface-modifying layer 3, insulating shell layer 4) comprising phosphor particles of ZnS:Cl, ZnS:Cu, Al, ZnCdS:Ag, Cl by selecting properly the afore-mentioned anion material and cation material.

While in the above-described examples, an explanation is given on the core-layer of nano-crystal phosphor made up of phosphor particles, it is possible to synthesize a composite nano-particle in which each of chemical species of two or above has a phase individually and forms one nano-sized particle. Particularly, it is possible to synthesize composite nano-particles having good dispersibility and nano-sized particles present individually, which are produced without occurrence of aggregation in the process of preparation of nano-sized composite nano-particles.

For the afore-mentioned composite nano-particle is shown an example having a core part made up of nano-crystal phosphor.

Examples other than nano-crystal phosphor are described below, in which a nano-crystal constituting a core part is changed.

EXAMPLE 16

Application to an Electrode Material for a Next-Generation Super Capacitor

In Example 16, a composite nano-particle synthesized by the synthesizing method shown in Example 1 is synthesized by using the following materials, having a core part made up of $FeS_2/SiO_2$.

Anion material—sodium sulfide, thiourea
Cation material—metallic salt containing iron
Examples of salts of inorganic acid containing iron—ferrous chloride, ferrous sulfide, ferrous phosphate
Examples of salts of organic acid containing iron—ferrous lactate, ferrous oxalate, ferric acetate, By using $FeS_2/SiO_2$ for $RuO_2$ used in a super capacitor, the volume theoretical capacity density obtained is 1.5 times that obtained by the use of RuO2.

EXAMPLE 17

Application to an Emission Material for an Organic EL Device

When an EL device having such a structure as describe below was formed by using the composite nano-particle of the present invention comprising as a core part $ZnS:Mn^{2+}$, a thin-film dispersion-type organic EL device showing the emission unique to $ZnS:Mn^{2+}$ was obtained.

On an insulating substrate having a device structure are mounted; an ITO electrode/a hole-injection layer made up of a film of CuPc (copper phthalocyanine)/an emission layer comprising ($ZnS:Mn^{2+}/SiO_2$) and another nano-crystal phosphors dispersed in PVK (polyvinylcarbazole)/an electron-injection layer comprising LiF/Al thin film electrode.

EXAMPLE 18

Application to an Inorganic EL Device

By using a nano-crystal phosphor of the present invention and dielectric material as an emission material for an organic dispersion-type EL device, a high performance inorganic thin film EL is obtained.

EXAMPLE 19

Application to Dyeing or Labeling on a Biopolymer

When a phosphor such as $ZnS:Mn^{2+}$ and CdSe/ZnS or another nano-phosphor is used as a biomarker, the surface of the phosphor must be hydrophilic. The surface of $ZnS:Mn^{2+}$/SiO2 and another nano-crystal phosphor of the present invention is made to be hydrophilic. Therefore, $ZnS:Mn^{2+}$/SiO2 and another nano-crystal phosphor of the present invention are an effective technique for dyeing or labeling on a biopolymer, because they have characteristics of good dispersibility.

The light resistance obtained in this case is ten to several hundreds times that obtained by the use of a conventional organic coloring matter.

EXAMPLE 20

Application to the Combined Use with LED $CaS:Mn^{2+}/SiO_2$ exhibits its absorption in the vicinity of 450 nm and fluoresces a light red color having an emission pole at 650 nm. It is, therefore, possible to change an emission wavelength by forming a layer of $CaS:Mn^{2+}/SiO_2$ on the surface of LED having an emission region at 450 nm.

Conventionally, a sulfide phosphor such as $CaS:Mn^{2+}/SiO_2$ etc. is easily decomposed by light. It is, however, possible to inhibit the decomposition by coating it with $SiO_2$ and expand the range of use.

EXAMPLE 21

Application to Phosphor for PDP

Since a conventional phosphor for POP exhibits its absorption in the side of long wavelength and absorbs little ultraviolet rays, the efficiency was low. When the size of the nano-crystal phosphor of the present invention is decreased, the absorption shifts to blue. Therefore, the nano-crystal phosphor of the present invention has good matching with ultraviolet rays. Further, the light resistance of the nano-crystal phosphor of the present invention can be improved by coating it with $SiO_2$.

INDUSTRIAL APPLICABILITY

As described above, according to the present invention, composite nano-particles can be produced by a co-precipitation method in the presence of both a dispersion-stabilizing agent and a surface-modifying agent, in which each of nano-sized phosphor particles and another chemical species of two or above has a phase individually and forms one nano-sized particle. Therefore, the composite nano-particles of the present invention have an effect in good dispersibility that the nano-sized phosphor having good dispersibility can be formed as independent particles without occurrence of aggregation of the phosphor.

Since the composite nano-particles in which each of phosphor particles and another chemical species of two or above has a phase individually and forms one nano-sized particle of the present invention has a three-layer structure comprising a nano-sized core layer, a surface-modifying layer made up of a surface-modifying agent covering the core layer and a nano-sized insulating layer covering the surface of the surface-modifying layer, the quantum size effect and quantum confined effect can be obtained sufficiently, and a good emission efficiency can be obtained with low speed electron beam.

What is claimed is:

1. An electron-excited nano-crystal phosphor made up of at least three parts of nano-sized composite nano-particles comprising:
   a core part of nano-crystal phosphor particle doped with an activator, the phosphor particle being selected from the group consisting of ZnS:Mn. ZnS:Cl, ZnS:Cu, Al, CaS:Eu, CaS:Ce, CaS:Mn, CaS:Cu, CaS:Sb, CaS:Eu, Ce, CaS:Sm, CaS:Pb, CaS:Gd, CaS:Tb, CaS:Dy, CaS:Ho, CaS:Er, CaS:Tm, CaS:Yb, MgS:Eu, MgS:Ce, MgS:Mn, SrS:Eu, SrS:Ce, SrS:Mn, BaS:Eu, BaS:Ce and BaS:Mn;
   a surface-modifying part coating the surface of the core part and having a bonding part for bonding the periphery of the core part to a bond defect of the nano-crystal phosphor particle; and an insulating shell part coating the surface of the surface-modifying part, the insulating shell part being formed of, as a substrate, a surface-modifying agent forming a glass state on the surface of the surface-modifying part, wherein the surface-modifying agent on the surface-modifying part having a covalent bond part forming a covalent bond with the bond defect of said composite nano-particles is an organometallic compound having SH group, —NH3 group at its terminal and the insulating shell part comprises a transparent material.

2. An electron-excited nano-crystal phosphor as defined in claim 1, wherein the transparent material comprises as a main component a compound selected from the group consisting of SiO, $SiO_2$, SiN, SiON, $Si_3N_4$, $Al_2O_3$, and TiO2.

3. An electron-excited nano-crystal phosphor made up of at least three parts of nano-sized composite nano-particles comprising:

a core part of nano-crystal phosphor particle doped with an activator, the phosphor particle being selected from the group consisting of ZnS:Mn, ZnS:Cl, ZnS:Cu, Al, CaS:Eu, CaS:Ce, CaS:Mn, CaS:Cu, CaS:Sb, CaS:Eu, Ce, CaS:Sm, CaS:Pb, CaS:Gd, CaS:Tb, CaS:Dy, CaS:Ho, CaS:Er, CaS:Tm, CaS:Yb, MgS:Eu, MgS:Ce, MgS:Mn, SrS:Eu, SrS:Ce, SrS:Mn, BaS:Eu, BaS:Ce and BaS:Mn;

a surface-modifying part coating the surface of the core part and having a bonding part for bonding the periphery of the core part to a bond defect of the nano-crystal phosphor particle; and an insulating shell part coating the surface of the surface-modifying part, the insulating shell part being formed of, as a substrate, a surface-modifying agent forming a glass state on the surface of the surface-modifying part, wherein said surface-modifying agent is illustrated by the general formula;

$(R_1O)(R_2O)(R_3O)Si—R_4—SH$ wherein each of $R_1$, $R_2$, $R_3$ and $R_4$ is an alkyl group.

4. An electron-excited nano-crystal phosphor made up of at least three parts of nano-sized composite nano-particles comprising:

a core part of nano-crystal phosphor particle doped with an activator, the phosphor particle being selected from the group consisting of ZnS:Mn, ZnS:Cl, ZnS:Cu, Al, CaS:Eu, CaS:Ce, CaS:Mn, CaS:Cu, CaS:Sb, CaS:Eu, Ce, CaS:Sm, CaS:Pb, CaS:Gd, CaS:Tb, CaS:Dy, CaS:Ho, CaS:Er, CaS:Tm, CaS:Yb, MgS:Eu, MgS:Ce, MgS:Mn, SrS:Eu, SrS:Ce, SrS:Mn, BaS:Eu, BaS:Ce and BaS:Mn;

a surface-modifying part coating the surface of the core part and having a bonding part for bonding the periphery of the core part to a bond defect of the nano-crystal phosphor particle; and an insulating shell part coating the surface of the surface-modifying part, the insulating shell part being formed of, as a substrate, a surface-modifying agent forming a glass state on the surface of the surface-modifying part, wherein the surface-modifying part of the composite nano-particles is carbonized.

5. A method of preparing an electron-excited nano-crystal phosphor comprising the steps of:

forming a core part of an electron-excited composite nano-crystal phosphor and a surface-modifying part for coating the surface of said core part concurrently by a coprecipitation method in the presence of both a dispersion-stabilizing agent and a surface-modifying agent; and forming a nano-sized insulating part on the surface of said surface-modifying part;

wherein said nano-crystal phosphor is selected from the group consisting of ZnS:Mn, ZnS:Cl, ZnS:Cu, Al, CaS:Eu, CaS:Ce, CaS:Mn, CaS:Cu, CaS:Sb, CaS:Eu, Ce, CaS:Sm, CaS:Pb, CaS:Gd, CaS:Tb, CaS:Dy, CaS:Ho, CaS:Er, CaS:Tm, CaS:Yb, MgS:Eu, MgS:Ce, MgS:Mn, SrS:Eu, SrS:Ce, SrS:Mn, BaS:Eu, BaS:Ce and BaS:Mn, and is prepared by a seciuential step of adding the sulfide phosphor matrix as an anion material and Group II metal as a cation material so as to coprecipitate the anion material and the cation material of the phosphor in that order, wherein said dispersion-stabilizing agent is a metallic salt having at least two carboxyl groups.

6. A method of preparing an electron-excited nano-crystal phosphor comprising the steps of:

forming a core part of an electron-excited composite nano-crystal phosphor and a surface-modifying part for coating the surface of said core part concurrently by a coprecipitation method in the presence of both a dispersion-stabilizing agent and a surface-modifying agent; and forming a nano-sized insulating part on the surface of said surface-modifying part;

wherein said nano-crystal phosphor is selected from the group consisting of ZnS:Mn, ZnS:Cl, ZnS:Cu, Al, CaS:Eu, CaS:Ce, CaS:Mn, CaS:Cu, CaS:Sb, CaS:Eu, Ce, CaS:Sm, CaS:Pb, CaS:Gd, CaS:Tb, CaS:Dy, CaS:Ho, CaS:Er, CaS:Tm, CaS:Yb, MgS:Eu, MgS:Ce, MgS:Mn, SrS:Eu, SrS:Ce, SrS:Mn, BaS:Eu, BaS:Ce and BaS:Mn, and is prepared by a sequential step of adding the sulfide phosphor matrix as an anion material and Group II metal as a cation material so as to coprecipitate the anion material and the cation material of the phosphor in that order, wherein said surface-modifying agent is an organometallic compound having —SH group, —NH3 group at its terminal.

7. A method of preparing an electron-excited nano-crystal phosphor as defined in claim 6, wherein said organometallic compound is 3-mercaptopropyl trimethoxysilane (MPS) illustrated by the chemical formula 1.

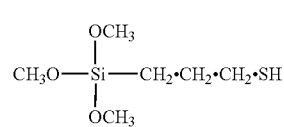

(chemical formula 1)

8. A method of preparing an electron-excited nano-crystal phosphor A method of preparing an electron-excited nano-crystal phosphor comprising the steps of:

forming a core part of an electron-excited composite nano-crystal phosphor and a surface-modifying part for coating the surface of said core part concurrently by a coprecipitation method in the presence of both a dispersion-stabilizing agent and a surface-modifying agent; and forming a nano-sized insulating part on the surface of said surface-modifying part;

wherein said nano-crystal phosphor is selected from the group consisting of ZnS:Mn, ZnS:Cl, ZnS:Cu, Al, CaS:Eu, CaS:Ce, CaS:Mn, CaS:Cu, CaS:Sb, CaS:Eu, Ce, CaS:Sm, CaS:Pb, CaS:Gd, CaS:Tb, CaS:Dy, CaS:Ho, CaS:Er, CaS:Tm, CaS:Yb, MgS:Eu, MgS:Ce, MgS:Mn, SrS:Eu, SrS:Ce, SrS:Mn, BaS:Eu, BaS:Ce and BaS:Mn, and is prepared by a sequential step of adding the sulfide phosphor matrix as an anion material and Group II metal as a cation material so as to coprecipitate the anion material and the cation material of the phosphor in that order, wherein in the step of forming the nano-sized insulating shell layer on the surface of the core layer of the composite nano-particle, said insulating shell layer is formed of sodium silicate.

9. A method of preparing an electron-excited nano-crystal phosphor comprising the steps of:

forming a core part of an electron-excited composite nano-crystal phosphor and a surface-modifying part for coating the surface of said core part concurrently by a coprecipitation method in the presence of both a dispersion-stabilizing agent and a surface-modifying agent; and forming a nano-sized insulating part on the surface of said surface-modifying part;

wherein said nano-crystal phosphor is selected from the group consisting of ZnS:Mn, ZnS:CI, ZnS:Cu, Al, CaS:Eu, CaS:Ce, CaS:Mn, CaS:Cu, CaS:Sb, CaS:Eu, Ce, CaS:Sm. CaS:Pb, CaS:Gd, CaS:Tb, CaS:Dy, CaS:Ho, CaS:Er, CaS:Tm, CaS:Yb, MgS:Eu, MgS:Ce, MgS:Mn, SrS:Eu, SrS:Ce, SrS:Mn, BaS:Eu, BaS:Ce and BaS:Mn, and is prepared by a seciuential step of adding the sulfide phosphor matrix as an anion material and Group II metal as a cation material so as to coprecipitate the anion material and the cation material of the phosphor in that order, wherein said dispersion-stabilizing agent is sodium citrate.

* * * * *

UNITED STATES PATENT AND TRADEMARK OFFICE
CERTIFICATE OF CORRECTION

| | |
|---|---|
| PATENT NO. | : 7,394,091 B2 |
| APPLICATION NO. | : 10/521233 |
| DATED | : July 1, 2008 |
| INVENTOR(S) | : Isobe et al. |

It is certified that error appears in the above-identified patent and that said Letters Patent is hereby corrected as shown below:

Title Page, Item (73) Assignee, "Keio University Faculty of Science and Technology (JP)" should read --Futaba Corporation (JP); Keio University Faculty of Science and Technology (JP)--.

Signed and Sealed this

Twenty-third Day of December, 2008

JON W. DUDAS
*Director of the United States Patent and Trademark Office*